(12) United States Patent
Butts et al.

(10) Patent No.: US 11,767,920 B2
(45) Date of Patent: Sep. 26, 2023

(54) SLIDING GATE VALVE COMPRISING A CARRIAGE

(71) Applicant: Vesuvius Group S.A., Ghlin (BE)

(72) Inventors: Jeffrey Butts, Veedersburg, IN (US); Jason Quinn, Mahomet, IL (US)

(73) Assignee: VESUVIUS GROUP, S.A., Ghlin (BE)

( * ) Notice: Subject to any disclaimer, the term of this patent is extended or adjusted under 35 U.S.C. 154(b) by 50 days.

(21) Appl. No.: 17/429,385

(22) PCT Filed: Feb. 27, 2020

(86) PCT No.: PCT/EP2020/055211
§ 371 (c)(1),
(2) Date: Aug. 9, 2021

(87) PCT Pub. No.: WO2020/174074
PCT Pub. Date: Sep. 3, 2020

(65) Prior Publication Data
US 2022/0128156 A1    Apr. 28, 2022

(30) Foreign Application Priority Data
Feb. 28, 2019   (EP) ..................... 19160063

(51) Int. Cl.
*F16K 3/30* (2006.01)
*B22D 41/24* (2006.01)
(Continued)

(52) U.S. Cl.
CPC ................ *F16K 3/30* (2013.01); *B22D 41/24* (2013.01); *B22D 41/34* (2013.01); *B22D 41/38* (2013.01); *F16K 3/0218* (2013.01)

(58) Field of Classification Search
CPC ......... F16K 3/30; F16K 3/0218; B22D 41/24; B22D 41/34; B22D 41/38
See application file for complete search history.

(56) References Cited

U.S. PATENT DOCUMENTS

| 4,582,232 A | 4/1986 | Shapland et al. |
| 5,698,129 A | 12/1997 | Keller et al. |
| (Continued) | | |

FOREIGN PATENT DOCUMENTS

| EP | 0727268 A2 | 8/1996 |
| WO | 97/31737 A1 | 9/1997 |
| WO | 2008116055 A1 | 9/2008 |

OTHER PUBLICATIONS

Office Action issued in corresponding Indian Patent Appln. No. 202117035550, dated Feb. 10, 2023.

*Primary Examiner* — Scott R Kastler
(74) *Attorney, Agent, or Firm* — MaxGoLaw PLLC (57) ABSTRACT

A sliding gate valve of a metallurgic vessel comprises a carriage. The carriage comprises a plate frame for supporting a first refractory plate and the plate frame is slideably mounted on a carriage support structure for sliding along a first axis. The carriage comprises a selecting device for selecting between a first stroke $\Delta X1$ and a second stroke $\Delta X2$ by moving a blocking member between a blocking and a non-blocking position. When the blocking member is located in the blocking position a first bumper portion of the plate frame is bumping into the blocking member if the plate frame is to slide beyond a nominal end-position. When the blocking member is located in the non-blocking position the first bumper portion is not bumping into the blocking member if the plate frame is to slide beyond a nominal end-position, thereby allowing the plate frame to slide beyond the nominal end-position to a service end-position.

13 Claims, 8 Drawing Sheets

(51) Int. Cl.
*B22D 41/34* (2006.01)
*B22D 41/38* (2006.01)
*F16K 3/02* (2006.01)

(56) References Cited

U.S. PATENT DOCUMENTS

| | | | |
|---|---|---|---|
| 5,836,485 A | 11/1998 | Plattner et al. | |
| 8,783,528 B1 * | 7/2014 | Hicks | B22D 41/24 266/236 |
| 9,341,271 B2 | 5/2016 | Boisdequin et al. | |
| 2004/0010452 A1 | 1/2004 | LaCour | |
| 2021/0268580 A1 * | 9/2021 | Schönbrenner | B22D 41/34 |
| 2022/0128156 A1 * | 4/2022 | Butts | B22D 41/24 |

* cited by examiner

SLIDING GATE VALVE COMPRISING A CARRIAGE

CROSS-REFERENCE TO RELATED APPLICATIONS

This application is a U.S. national stage application, filed under 35 U.S.C. § 371, of International Application No. PCT/EP2020/055211, which was filed on Feb. 27, 2020, and which claims priority from European Patent Application No. EP 19160063.4, which was filed on Feb. 28, 2019, the contents of each of which are incorporated by reference into this specification.

BACKGROUND OF THE INVENTION

(1) Field of the Invention

The present invention is related to a sliding gate valve for controlling a flow of liquid metal out of a metallurgic vessel. More specifically, the invention relates to sliding gate valve comprising a carriage comprising a carriage support structure and a plate frame for supporting a refractory plate, and wherein the plate frame is slidably mounted with respect to the carriage support structure.

(2) Description of the Related Art

In a liquid metal casting installation, metallurgic vessels are generally used to transport the liquid metal to a distributor intended for distributing the liquid metal in casting moulds. Such metallurgic vessels have an outlet in a bottom floor through which the liquid metal can be poured into the distributor or into any other type of container.

For controlling the flow of liquid metal through the outlet of a metallurgic vessel, a regulation valve disposed at the bottom floor of the metallurgic vessel is typically used.

A type of regulation valve is a so-called sliding gate valve generally composed of a plurality of refractory plates, for example two or three refractory plates. In embodiments, two superimposed refractory plates are for example provided wherein a first plate is a sliding refractory plate and a second plate is fixed refractory plate. Each of the refractory plates is supported by a proper support structure. The fixed refractory plate is supported by a fixed underframe that is coupled to the bottom floor of the metallurgic vessel and the sliding refractory plate is located in a carriage wherein a plate frame is supporting the sliding refractory plate.

The carriage comprises a sliding mechanism configured for sliding the plate frame along an axis with respect to a carriage support structure that is coupled to the fixed underframe. Generally the coupling between the carriage and the fixed underframe is made through a hinged connection such that the carriage can be separated from the fixed underframe as a pivoting door, which facilitates service activities.

The sliding refractory plate can move between an open position and a closed position. In the open position, also named casting position, an aperture of the fixed refractory plate is facing an aperture of the sliding refractory plate such that liquid metal is allowed to pass through the two apertures for supplying liquid metal from the vessel to the distributor. On the other hand, when the plate frame supporting the sliding refractory plate is moved to the closed position, the apertures of the fixed and sliding refractory plate are separated by a given distance defined such that the flow of liquid metal is stopped.

To activate the movement of the plate frame from an open to a closed position, a driving device is used such as a hydraulic actuator comprising a cylinder and an actuator rod, as described for example in U.S. Pat. No. 9,341,271B2. Such a driving device is typically attached to an end side of the plate frame.

To prevent liquid metal from entering crevices between the refractory plates, the usual practice is to firmly press the refractory plates against each other. Therefore, resilient pressing elements, typically comprising a number of springs, are provided to apply a pushing force to a lower surface of the sliding refractory plate such that the sliding refractory plate and the fixed refractory plate remain in a firm contact when moving between an open and closed position.

It is known that the refractory plates wear rapidly and hence it is necessarily to replace the plates on a regular basis. For this purpose, the carriage needs to be separated from the fixed underframe in order to have access to the refractory plates. As mentioned above, due the hinged coupling, the carriage can be pivoted as a door. However, as the pushing device exerts a force to hold the refractory plates together, the pressure between the plates needs to be reduced before the pivoting door can be opened for service purposes. The reduction of the pressure can be established by moving the sliding refractory plate over a longer stroke distance such that the sliding plate is further separated from the fixed refractory plate. Therefore, a carriage is typically configured to allow the plate frame to enter in an overstroke zone where the pressure between the refractory plates is sufficiently reduced to allow opening the door. The overstroke zone is reached by moving the plate frame beyond a nominal stroke distance. An example of a configuration for such a carriage is disclosed in document U.S. Pat. No. 5,836,485.

However, one of the problems is that during nominal operation of the sliding gate valve, i.e. during casting, where the sliding frame can be moved from an open to a closed position as discussed above, the carriage should not accidently enter the overstroke zone as this could lead to dangerous situations as, when in the overstroke zone, the sealing force between the refractory plates is eliminated and liquid steel can be lost.

A known solution for this problem is to limit the driving mechanism such that it cannot drive the plate frame in the overstroke zone. This is typically done by placing a pin in the drive mechanism, i.e. minimise the stroke of the driving rod. A problem with this solution is however that the pin needs to be positioned and removed manually by an operator, which is not only cumbersome but there is also a risk that the operator forgets to insert the pin after the maintenance activities. Further risks are that the cylinder is not installed properly or that a cylinder with an incorrect stroke is installed, which could lead to situations where the plate frame accidently enters in the overstroke zone.

BRIEF SUMMARY OF THE INVENTION

It is an object of the present invention to provide a sliding gate valve that provides an alternative solution for controlling the positioning of the carriage in an overstroke zone where pressure between the refractory plates is relieved. More specifically, it is an object to improve safe operation of a carriage and an associated sliding gate valve.

The present invention is defined in the appended independent claims. Selected embodiments are defined in the dependent claims. According to an aspect of the present disclosure, a sliding gate valve for controlling a flow of liquid metal out of a metallurgic vessel is provided. The sliding gate valve comprises a carriage for a sliding gate valve of a metallurgic vessel, comprising a carriage support structure and a plate frame for supporting a first refractory plate, and wherein the plate frame is slideably mounted on the carriage support structure for sliding along a first axis (X), a fixed underframe configured for supporting a second refractory plate in a fixed position with respect to the fixed underframe, and said fixed underframe comprises fixing elements for fixing the fixed underframe to a bottom floor of the metallurgic vessel.

The carriage is coupled to the fixed underframe, wherein the carriage and the fixed underframe are configured such that when first and second refractory plates are supported in the respective plate frame and fixed underframe, a sliding surface of the first refractory plate comprising a first aperture can slide within a first stroke $\Delta X1$ against a sliding surface of the second refractory plate comprising a second aperture, thereby allowing to bring the first and second apertures in and out of registry, by sliding the plate frame to respectively an initial position of said plate frame corresponding to the open valve position and to a nominal end-position of said plate frame corresponding to a closed valve position.

The carriage according to the present disclosure is characterized in that the carriage support structure comprises a selecting device for selecting between the first stroke $\Delta X1$ and a second stroke $\Delta X2$ of the plate frame with $\Delta X2 > \Delta X1$, and wherein the selecting device comprises a blocking member reversibly moveable between a blocking position for selecting the first stroke $\Delta X1$ and a non-blocking position for selecting the second stroke $\Delta X2$. The first stroke $\Delta X1$ and the second stroke $\Delta X2$ are defined as maximum plate frame sliding distances measured between the initial position X0 and respectively the nominal end-position X1 and a service end-position X2.

The plate frame and the selection device are configured such that when the blocking member is positioned in the blocking position, a first bumper portion of the plate frame is bumping into the blocking member if the plate frame is to slide beyond the nominal end-position, thereby limiting the plate frame to slide within the first stroke $\Delta X1$. When the blocking member is positioned in the non-blocking position, the first bumper portion does not bump into the blocking member when the plate frame is sliding beyond the nominal end-position X1, thereby allowing the plate frame to slide within the second stroke $\Delta X2$ beyond the nominal end-position X1 to the service end-position X2.

The carriage comprises resilient pressing elements configured such that when first and second refractory plates are supported in the respective plate frame and fixed underframe then:

a pressure is exercised by said resilient pressing elements pressing the sliding surface of the first refractory plate against the sliding surface of the second refractory plate when the plate frame is located within the first stroke $\Delta X1$, and no pressure or a reduced pressure is exercised by said resilient pressing elements onto the sliding surfaces when the plate frame is located at the service end-position X2, The selecting device of the carriage support structure comprises a moving mechanism for moving the blocking member with respect to the carriage support structure between the blocking position and the non-blocking position. The moving mechanism of the selecting device is configured such that when the plate frame is being moved from the service end-position X2 towards the initial position X0, the blocking member automatically moves from the non-blocking position to the blocking position at the moment the plate frame is sliding beyond the first end position X1. Advantageously, as no intervention is needed to engage the blocking device, e.g. by an operator, one cannot forget to position the blocking member in the blocking position after completing a service operation.

Advantageously, during normal operation of the carriage, i.e. during casting, the blocking member being positioned in the blocking position limits the plate frame to slide within the first stroke $\Delta X1$ and thereby prevents the plate frame from sliding to the service end-position.

Advantageously, the selection device is a mechanical device that is incorporated in the carriage support structure and cannot be left off by the operator. This is in contrast to prior art systems where a pin in the drive system is to be installed and removed manually by an operator to limit the stroke.

Advantageously, with the carriage according to the present invention, the plate frame is prevented from sliding beyond a nominal end-position by mechanically limiting the stroke independently of the operation of the driving mechanism of the plate frame.

In selected embodiments, the moving mechanism is configured for translating the blocking member along a second axis transverse, preferably normal to the first axis, between the blocking position and the non-blocking position.

In embodiments, the moving mechanism comprises one or more compression springs, each spring having a central compression axis essentially parallel with the second axis and each spring is coupled with a first end to a first frame member of the selecting device and with a second end to the blocking member. In this way, a compression and decompression of the one or more compression springs results in a translation of the blocking member along the second axis.

Preferably, the moving mechanism comprises a deblocking tool configured for exercising a force against a biasing force of the one or more compression springs in order to translate the blocking member along the second axis from the blocking to the non-blocking position.

In embodiments, the deblocking tool comprises a cam member located between a second frame member of the selecting device and the blocking member. The cam member is rotatable around a cam rotation axis normal to both first and second axes and configured such that a separation distance between the second frame member and the blocking member is increasing when rotating the cam member from a first cam position to a second cam position. In this way, by rotating the cam member to the second position, the one or more compression springs are being compressed such that the blocking member is translating from the blocking position to the non-blocking position. Preferably the cam member is rotated over an angle between 80° and 120° when rotating from the first to the second cam position.

In embodiments, the cam member is coupled to an axle extension extending coaxially with the cam rotation axis. The axle extension can then be rotated either manually by an operator or automatically by using a motor. Alternatively, a robot can be used to rotate the axle extension.

In embodiments, the plate frame comprises a second bumper portion configured such that when the blocking member is located in the non-blocking position, the second bumper portion bumps against the cam member upon sliding from the nominal end-position to the service end-position and causes the cam member to rotate from the second cam position to the first cam position. The first bumper portion is configured such that when the plate frame is sliding beyond the nominal end-position towards the service end-position, the blocking member is being prevented from translating to the blocking position by resting on a surface of the first bumper portion.

In embodiments, the first bumper portion has a length LB1 measured along an axis parallel with said first axis and wherein LB1=ΔX2−ΔX1.

Preferably, the second bumper portion has length LB2 measured along the axis parallel with said first axis and wherein LB2<LB1, preferably LB2<0.8×LB1, more preferably LB2<0.6×LB1.

In alternative embodiments, the moving mechanism is configured for rotating the blocking member between the blocking position and the non-blocking position, preferably the moving mechanism has a rotation axis essentially perpendicular to the first axis.

In embodiments, the carriage according to the present disclosure comprises a driving device coupled to the plate frame and configured for driving the plate frame along the first axis within the first stroke ΔX1 and within the second stroke ΔX2.

Typically, the carriage and fixed underframe are configured such that when first and second refractory plates are supported in the respective plate frame and fixed underframe and when sliding the plate frame within the first stroke ΔX1, a sliding surface of the first refractory plate comprising a first aperture slides against a sliding surface of the second refractory plate comprising a second aperture, thereby allowing to bring the first and second apertures in and out of registry by sliding the plate frame to respectively the initial position and to the nominal end-position.

Advantageously, when at the service end-position, the refractory plates can be safely removed and replaced.

According to a further aspect of the present disclosure, a system comprising a sliding gate valve as described supra and a robot is provided. The robot is configured to operate the moving mechanism of the carriage support structure from the blocking to the unblocking position.

BRIEF DESCRIPTION OF THE SEVERAL VIEWS OF THE DRAWINGS

These and further aspects of the invention will be explained in greater detail by way of example and with reference to the accompanying drawings in which.

DETAILED DESCRIPTION OF THE INVENTION

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

Figure 1A:
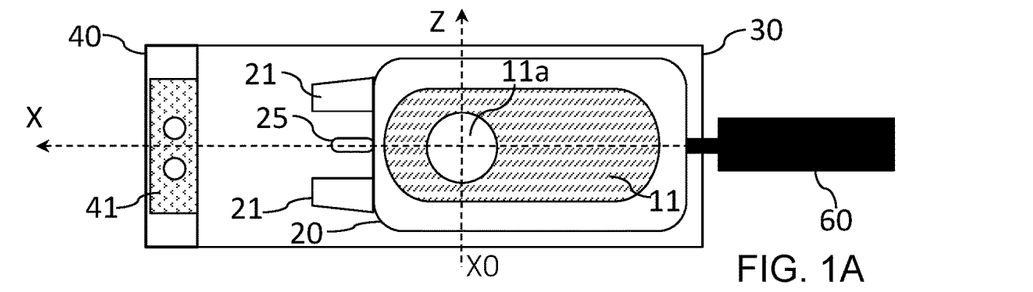
FIG. 1a to FIG. 1c schematically show cross sectional views of a carriage according to the present disclose wherein a plate frame is positioned at three different positions X0, X1 and X2 along a first axis X, FIG. 2a to FIG. 2b schematically illustrate a carriage comprising a selecting device according to a first embodiment of the invention wherein a blocking member is positioned in respectively a blocking and non-blocking position, FIG. 3a to FIG. 3d schematically illustrate a plate frame sliding from an initial position to a service end-position and sliding back towards the initial position.
Figure 1B:
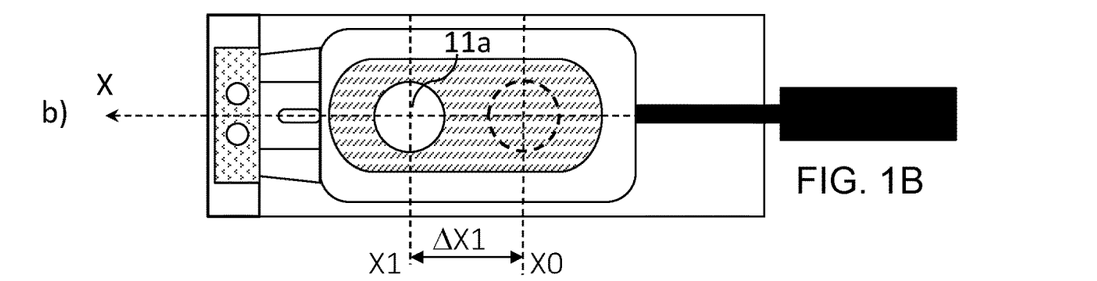
Figure 1C:
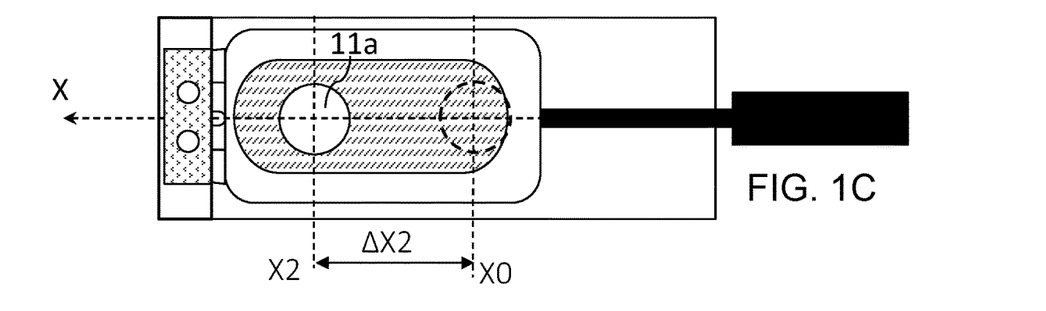

An exemplary embodiment of carriage for a sliding gate valve according to the present disclosure is shown in FIGS. 4a to 5c. The carriage 1 comprises a carriage support structure 30 and a plate frame 20 for supporting a first refractory plate 11. As schematically illustrated in FIG. 1a to FIG. 1c, the plate frame 20 is slideably mounted on the carriage support structure 30 for sliding along a first axis X. The first axis X is associated to the carriage support structure 30.

The carriage support structure 30 according to the present disclosure comprises a selecting device 40 for selecting between a first stroke ΔX1 and a second stroke ΔX2 with ΔX2>ΔX1. As illustrated in FIG. 1a to FIG. 1b, the first stroke ΔX1 and the second stroke ΔX2 are defined as maximum plate frame sliding distances measured between an initial position X0 of the plate frame and respectively a nominal end-position X1 and a service end-position X2 of the plate frame. In other words, the selecting device 40 allows to select to either operate the carriage in a nominal mode for sliding the plate frame within the first stroke ΔX1 or to select to operate the carriage in a service mode for sliding the plate frame within the second stroke ΔX2 that is larger than the first stroke ΔX1.

In FIG. 1a, the plate frame is positioned at the initial position X0 and by sliding the plate frame along the axis X, the plate frame can be positioned at a distance further away from the initial position. As illustrated in FIG. 1b, after sliding the plate frame over the distance ΔX1, the nominal end-position X1 is reached. In FIG. 1c, the plate frame has been slid over a distance ΔX2>ΔX1 with respect to the initial position X0 and a service end-position X2 has been reached.

In the exemplary embodiment shown in FIG. 1a, when the plate frame 20 is supporting the first refractory plate 11 and when being in the initial position, a center of the first opening 11a of the first refractory plate 11 has an abscissa on the first axis X that is equal to X0. When moving, the plate frame in the axis direction of the first axis X shown in FIG. 1a, the abscissa of the center of the first opening is increasing and when reaching the nominal end-position and the service end-position, as shown in FIG. 1b and FIG. 1c, the abscissa of the center of the first opening has become equal to respectively X1 and X2. In this way, the position of the plate frame with respect to the carriage support structure can be defined through the value of the abscissa of the center of the first opening 11a. In other embodiments, defining the position of the plate frame with respect to the carriage support structure 30 can be done in any other suitable way.

As discussed above, the carriage according to the present disclosure is part of a sliding gate valve for controlling a flow of liquid metal out of a metallurgic vessel. Generally, the first stroke ΔX1 is defined to correspond to a nominal stroke for moving the first refractory plate 11 between an open position for poring liquid metal and a closed position where the flow of the liquid metal is stopped. The second stroke ΔX2>ΔX1 is used during service operations, e.g. for replacing the refractory plates, and the difference in stroke, i.e. ΔX2−ΔX1, corresponds to the overstroke zone mentioned above.

Figure 2A:
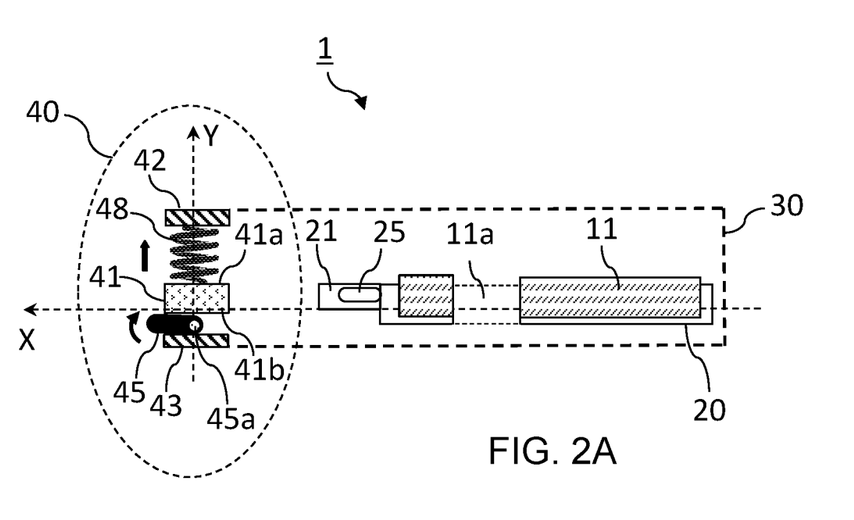

As schematically illustrated in FIG. 1a and FIG. 2a, the selecting device 40 comprises a blocking member 41 reversibly moveable between a blocking position for selecting the first stroke ΔX1 and a non-blocking position for selecting the second stroke ΔX2.

Figure 2B:
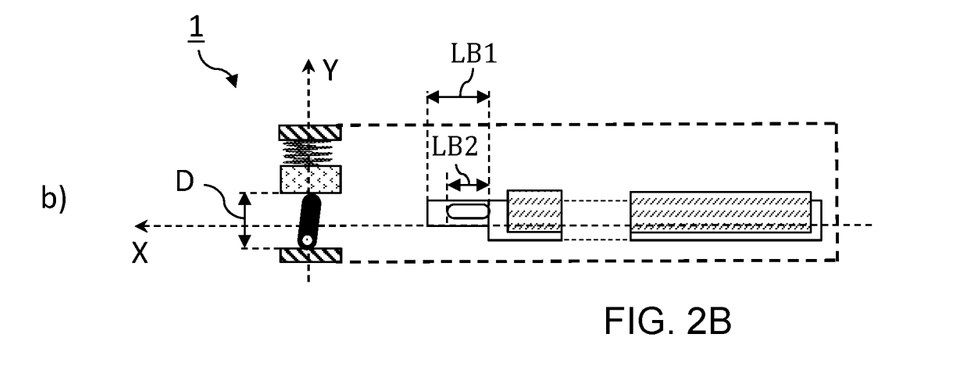

An example of a blocking and a non-blocking position of the blocking member are shown in respectively FIG. 2a and FIG. 2b. As illustrated on these figures, the plate frame 20 and the selection device 40 are configured such that when the blocking member 41 is positioned in the blocking position, a first bumper portion 21 of the plate frame 20 is bumping into the blocking member 41 if the plate frame 20 is to slide beyond the nominal end-position X1. In other words, when the blocking member is in the blocking position, it is blocking the trajectory path of the sliding plate frame and hence prohibits the plate frame to slide beyond the nominal end-position. In this way, the plate frame 20 is mechanically limited to slide within the first stroke ΔX1.

On the other hand, when the blocking member 41 is positioned in the non-blocking position, the first bumper portion 21 does not bump into the blocking member 41 when the plate frame 20 is sliding beyond the nominal end-position X1. In other words, when the blocking member is in the non-blocking position, the trajectory path of the plate frame 20 is not blocked. In this way, the plate frame 20 is allowed to slide beyond the nominal end-position X1 to the service end-position X2.

In embodiments, the blocking member 41 is for example a steel body having at least a front surface transverse to the first axis X and configured such that when the blocking member is in the blocking position, the front surface is acting as a blocking surface for the first bumper portion 21 of the plate frame 20 when the plate frame is sliding beyond the nominal end-position.

For moving the blocking member 41 between the blocking position and the non-blocking position, the selecting device 40 comprises a moving mechanism. Different types of moving mechanisms can be conceived to move the blocking member 41 between the blocking position and the non-blocking position and the moving mechanism can for example move the blocking member through a translation motion, a rotation motion or a combination of both.

In an embodiment, as illustrated in FIG. 2a and FIG. 2b, the moving mechanism is configured for translating the blocking member 41 along a second axis Y transverse, preferably normal to the first axis X between the blocking position and the non-blocking position.

In embodiments wherein the moving mechanism is moving the blocking member 41 through a translation motion, the moving mechanism comprises for example one or more compression springs 48 having a central compression axis essentially parallel with the second axis Y, as schematically illustrated in FIG. 2a. By coupling a first end of the spring to the blocking member 41, for example to a first side 41a of the blocking member 41, and coupling a second end of the spring to a first frame member 42 of the selecting device 40, the blocking member 41 can be translated along the second axis Y by compressing and de-compressing the one or more compression springs. In embodiments, the one or more compression springs are for example helical springs.

The first frame member 42 of the selecting device 40 illustrated in FIG. 4a to FIG. 5c, is to be construed as a rigid element of the main frame of the carriage support structure 30. Depending on the detailed design of the carriage support structure 30, the first frame member 42 can either be a separate element that is bolted or welded to a main frame structure of the carriage support structure 30 or it can be an integrated portion of the main frame structure of the carriage support structure.

Figure 4A:
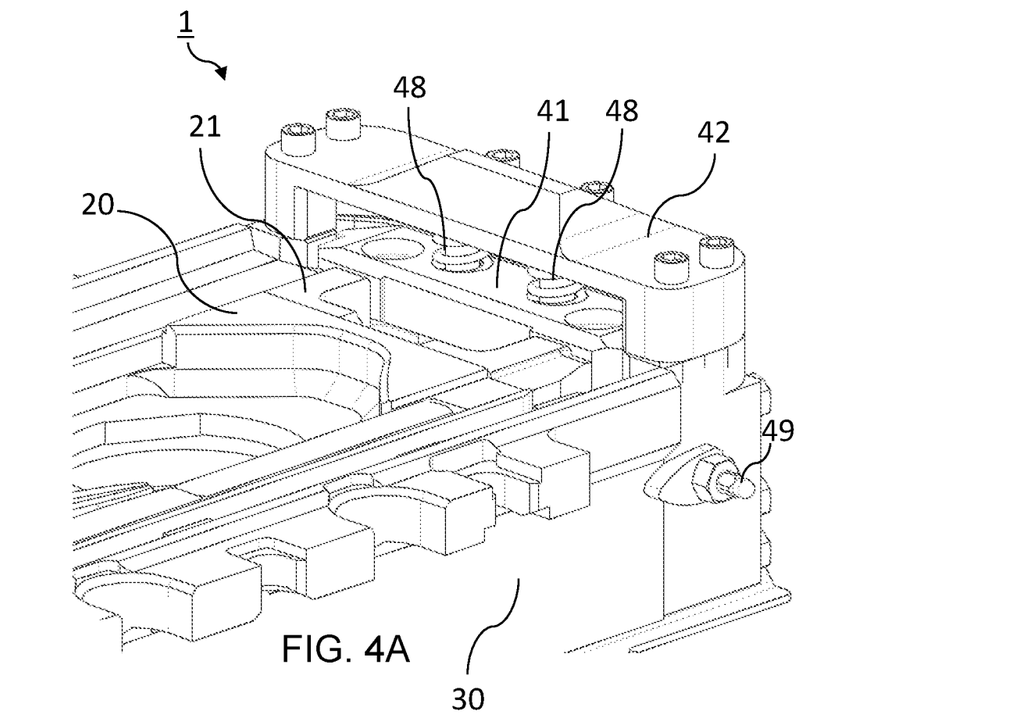
FIG. 4a to FIG. 4c show a perspective view of parts of an embodiment of a carriage according to the present disclosure wherein the blocking member is in the blocking position.
Figure 4B:
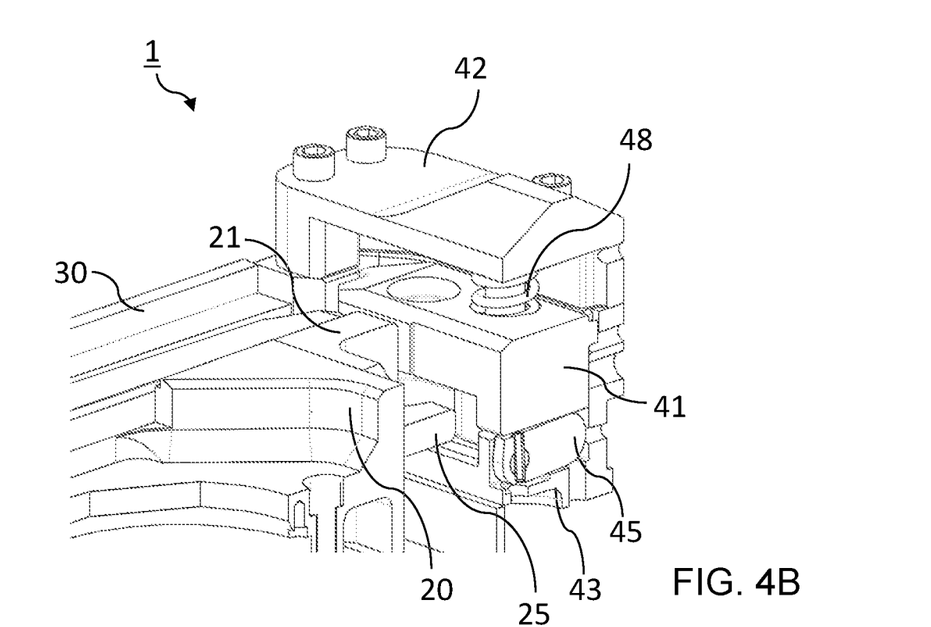
Figure 4C:
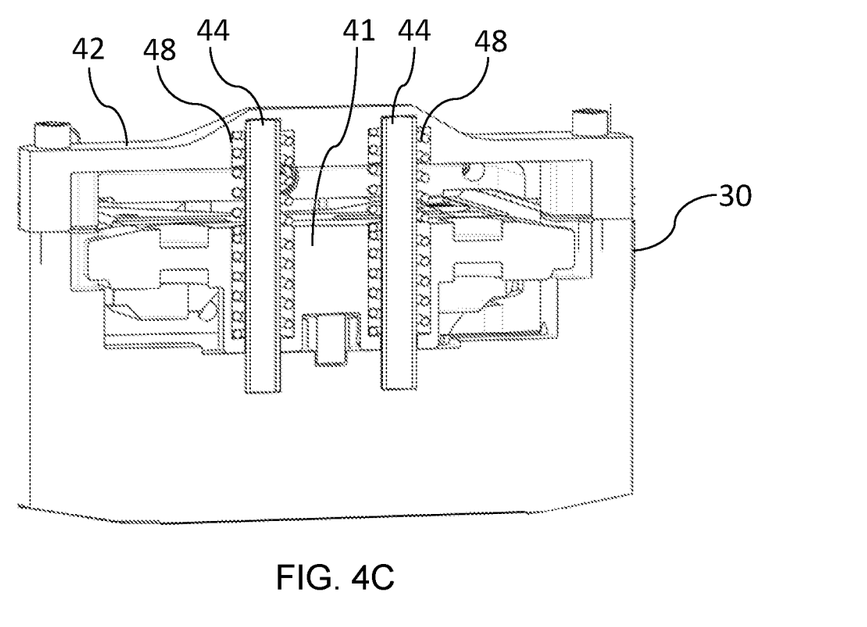
Figure 5A:
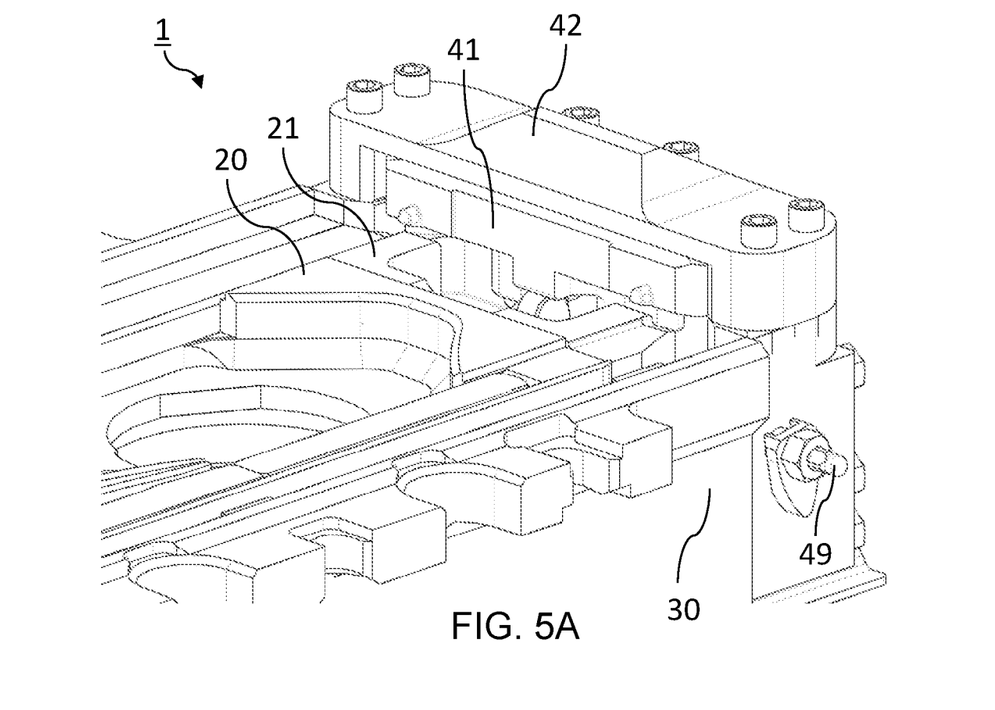
FIG. 5a to FIG. 5c show a perspective view of parts of an embodiment of a carriage according to the present disclosure wherein the blocking member is in the non-blocking position, FIG. 6 schematically shows a sliding gate valve comprising a carriage according to the present disclosure and wherein the sliding gate valve is coupled to a bottom floor of a metallurgic vessel, FIG. 7a to FIG. 7b schematically illustrate a carriage comprising a selecting device according to a second embodiment of the invention wherein a blocking member is positioned in respectively a blocking and non-blocking position.
Figure 5B:
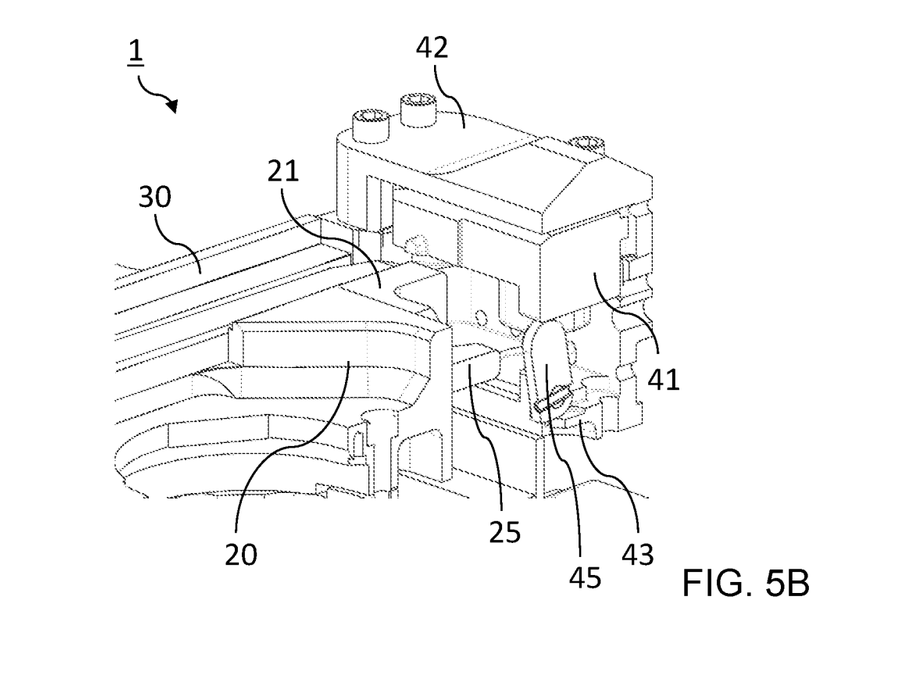
Figure 5C:
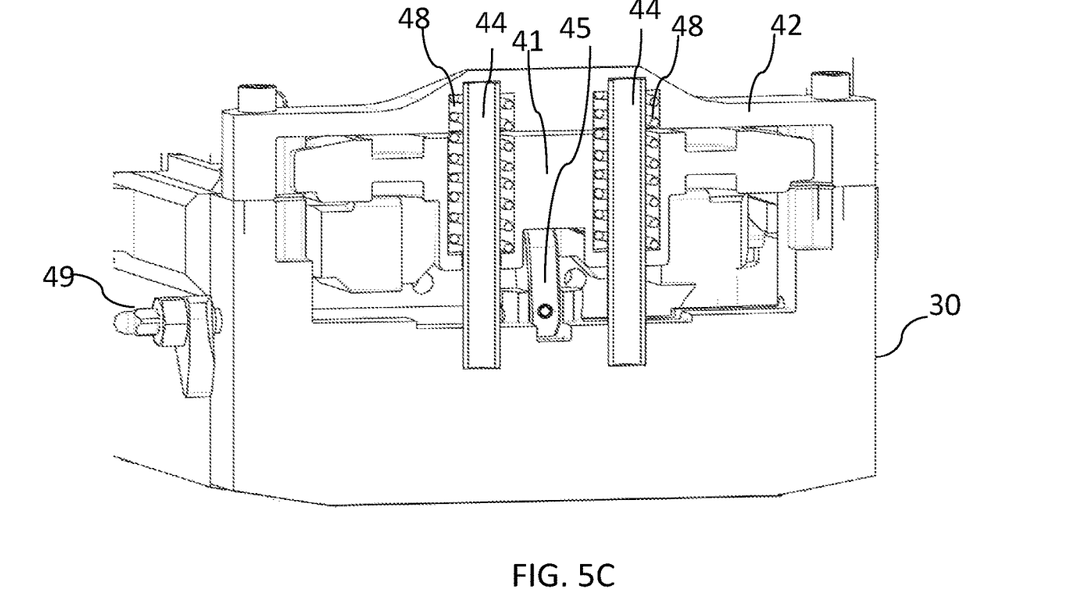

In embodiments, illustrated in FIG. 4a to FIG. 5c, the moving mechanism comprises two compression springs and two closed bores made in the blocking member are receiving a portion of the springs, for example 50% of the spring free length. In these embodiments, the first ends of the springs are attached to a bottom part of the closed bores made in the blocking member and the second ends of the helical springs are attached, as mentioned above, to a first frame member 42 of the selection device. FIGS. 4c and 5c show a cross sectional view of the selection device, thereby illustrating the position of the springs when in respectively the blocking and non-blocking position. To facilitate and guide the translation motion between the blocking and non-blocking position of the blocking member 41, a fixed rod 44 can be placed inside each of the springs and the rod can be coupled at one end with the first frame member 42 and the second end of the rod can be coupled to a second frame member 43.

In the embodiments shown in FIG. 2a, FIG. 4a, FIG. 4b and FIG. 4c, when the blocking member 41 is engaged for blocking the plate frame 20 from sliding beyond the nominal end-position X1, the one or more compression springs are de-compressed. The de-compression state of the springs corresponds to the compression springs having their spring free length, i.e. the length of the spring without any force applied to it. As the nominal stroke ΔX1 is the stroke the sliding gate valve is operating during most of the time, the compression springs will be most of the time in the de-compressed state, thereby increasing the spring life time. On the other hand, if the blocking member 41 is disengaged and is not blocking the plate frame 20 from sliding beyond the nominal end position X1, the one or more compression springs are compressed, as illustrated in FIG. 2b, FIG. 5a, FIG. 5b and FIG. 5c. The blocking member 41 is disengaged only during service operations when for example the refractory plates need replacement, hence the compression springs are only compressed during a limited time frame.

For engaging and disengaging the blocking member 41, i.e. bringing the blocking member 41 in respectively the blocking and the non-blocking position, the carriage 1 comprises a deblocking tool. The deblocking tool is configured for exercising a force against a biasing force of the one or more compression springs in order to translate the blocking member 41 along the second axis Y from the blocking to the non-blocking position.

Figure 7A:
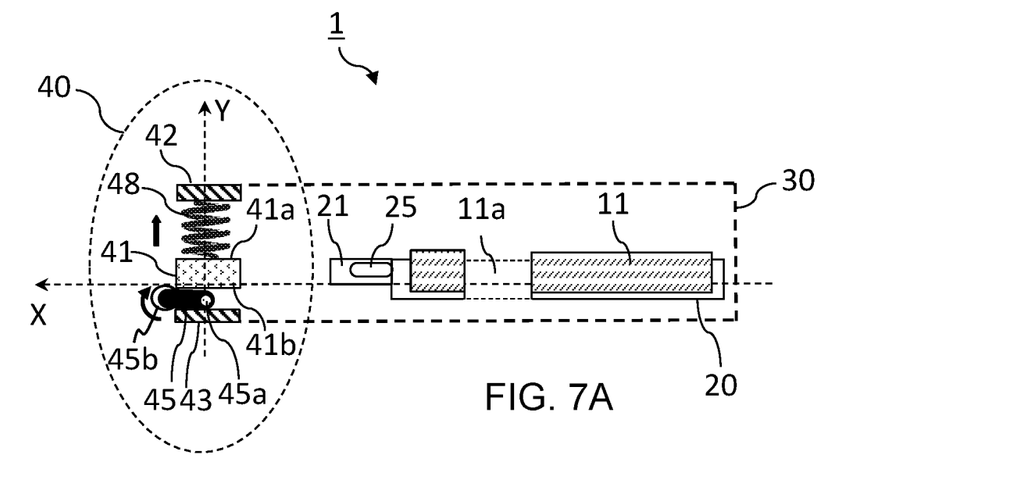
Figure 7B:
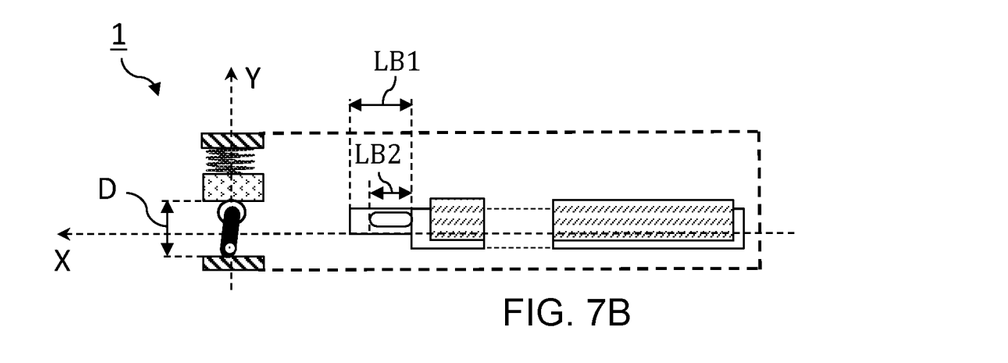

In embodiments, as schematically illustrated in FIG. 2a and FIG. 2b, the deblocking tool comprises a cam member 45 located between a second frame member 43 of the selecting device 40 and the blocking member 41. More specifically, in embodiments, the cam member 45 is located between the second frame member 43 and a second side 41b of the blocking member 41, opposite the first side 41a of the blocking member. The cam member 45 is rotatable around a cam rotation axis 45a normal to both first X and second Y axes. The cam member 45 advantageously comprises a first end located on the cam rotation axis 45a and a second end for driving the blocking member 41. As schematically illustrated in FIG. 2b, a separation distance D between the second frame member 43 and the second side 41b of the blocking member is increasing when rotating the cam member 45 from a first cam position to a second cam position thereby compressing the one or more compression springs such that the blocking member is moving from the blocking position to the non-blocking position. When the compression spring is compressed by rotating the cam member from the first to the second cam position, the length of the compression spring, measured along the central compression axis, is decreased with an amount equal to the increase of the separation distance D defined above. In some embodiments, as illustrated in FIG. 7a and FIG. 7b, the second end of the cam member 45 comprises a cam roller 45b configured to enter in a rolling contact with the second side 41b of the blocking member 41.

In embodiments, the cam member 45 is typically rotated over an angle between 80° and 120° when rotating from the first to the second cam position. In other words, the cam is rotating from a mainly horizontal position parallel with the X axis to a mainly vertical position parallel with the Y axis.

In embodiments as illustrated in FIG. 4a, FIG. 5a and FIG. 5c, the cam member 45 is coupled to an axle extension 49 extending coaxially with the cam rotation axis 45a. By rotating the axle extension 49, by an operator, a motor, or a robot, the cam member 45 can be moved from the first cam position to the second cam position.

In selected embodiments, as schematically illustrated in FIG. 3a to FIG. 3d, the moving mechanism is configured for automatically moving the blocking member 41 from the non-blocking position to the blocking position when the plate frame 20 is moving back from the service end-position X2 towards the initial position X0. More precisely, when the plate frame is being moved from the service end-position X2 in the direction of the initial position X0, the blocking member 41 moves from the non-blocking to the blocking position at the moment when the plate frame has passed beyond the first end-position X1. The automatic engaging of the blocking member when the plate frame is moved out of the overstroke zone, provides for a fail-safe carriage configuration. Indeed, in this way, the dangerous situation wherein the plate frame would accidently slide beyond the nominal end-position while being in nominal operation, i.e. during casting, is avoided.

Figure 3A:
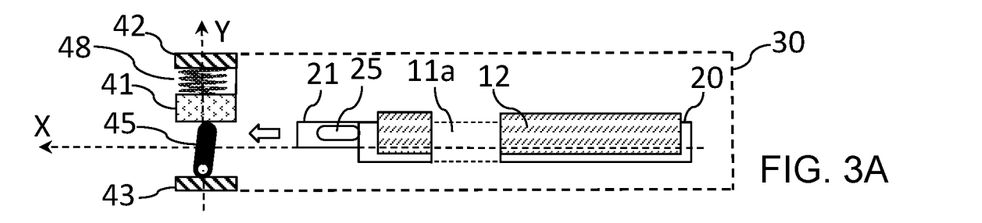
Figure 3B:
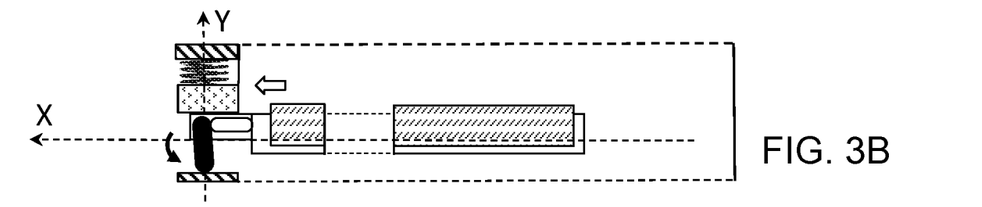
Figure 3C:
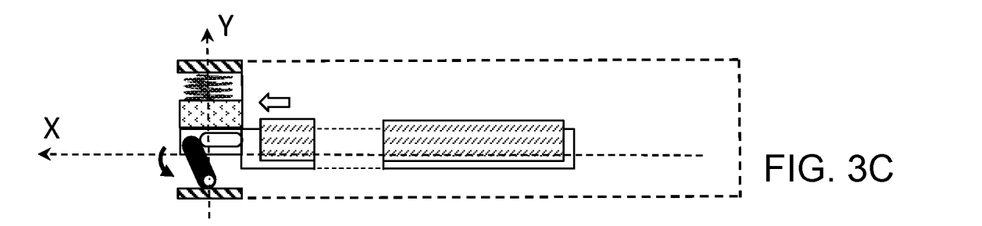
Figure 3D:
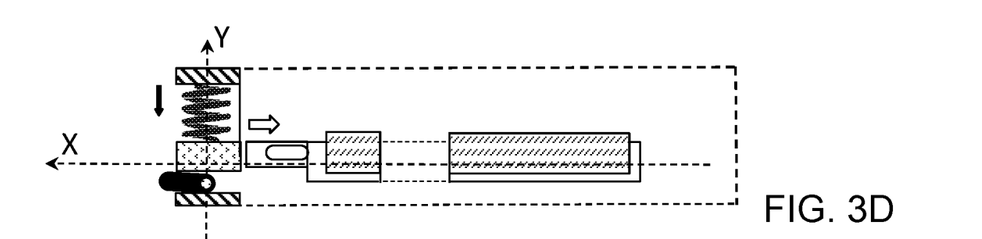

To establish the automatic movement of the blocking member from the non-blocking to the blocking position, the plate frame 20 comprises a second bumper portion 25 configured such that when the blocking member 41 is located in the non-blocking position, the second bumper portion bumps against the cam member 45 upon sliding from the nominal end-position X1 to the service end-position X2, thereby causing the cam member 45 to rotate from the second cam position to the first cam position. As schematically illustrated in FIG. 3b and FIG. 3c, during this rotation of the cam due to the bumping of the second bumper portion, the blocking member 41 is being prevented from translating back to the blocking position by resting on a surface of the first bumper portion 21, in this example an upper surface of the first bumper portion.

In embodiments, the first bumper portion is a separate part, e.g. a steel body, attached to a portion of a main frame of the plate frame. If the first bumper portion is a separate part, it can be bolted or welded to the main frame of the plate frame 20. In alternative embodiments, the first bumper portion can be an integral part of a main frame of the plate frame.

As illustrated in FIG. 2b, the first bumper portion 21 has a length LB1 measured along an axis parallel with the first axis X. In embodiments, this length LB1 of the first bumper portion is equal to the difference between the second and the first stroke, i.e. $LB1=\Delta X2-\Delta X1$.

In embodiments, the second bumper portion 25 is a part, e.g. a steel body, that is for example bolted or welded to the main frame of the plate frame.

The second bumper portion 25 has a length LB2, measured along the axis parallel with the first axis X, and this second length LB2 is generally smaller than the length LB1 of the first bumper portion. In this way, when moving the plate frame beyond the nominal end-position X1 towards the service end-position X2, the second bumper portion only bumps against the cam member 45 after having slid a given distance beyond the end-position X1, thereby allowing the first bumper portion to start sliding under the blocking member before the cam member starts rotating. As schematically illustrated in FIG. 3b and FIG. 3c, this allows the blocking member 41 to rest on the upper surface of the first bumper portion 21 when the plate frame 20 is continuing sliding and the cam member 45 starts rotating from the second cam position to the first cam position, as discussed above. Preferably $LB2<0.8\times LB1$, more preferably $LB2<0.6\times LB1$.

In embodiments, for sliding the plate frame 20 with respect to the carriage support structure 30, the carriage support structure comprises rollers configured to cooperate with the plate frame to facilitate the sliding of the plate frame along the first axis X.

Typically, the gliding of the plate frame is automated. In embodiments, as schematically shown in FIG. 1a to FIG. 1c, the carriage comprises a driving device 60 coupled to the plate frame 20 and configured for driving the plate frame 20 along the first axis X within the first stroke $\Delta X1$ and within the second stroke $\Delta X2$. The driving device is for example a hydraulic actuator comprising a cylinder and an actuator rod, as described for example in U.S. Pat. No. 9,341,271B2. Such a driving device is typically attached to an end side of the plate frame.

The embodiments discussed so far have a moving mechanism that is configured for translating the blocking member along an axis transversal to the first axis X. In alternative embodiments, the moving mechanism is configured for rotating the blocking member 41 between the blocking position and the non-blocking position. Such a rotating moving mechanism has for example a rotation axis for rotating the blocking member that is essentially perpendicular to the first axis X.

Figure 6:
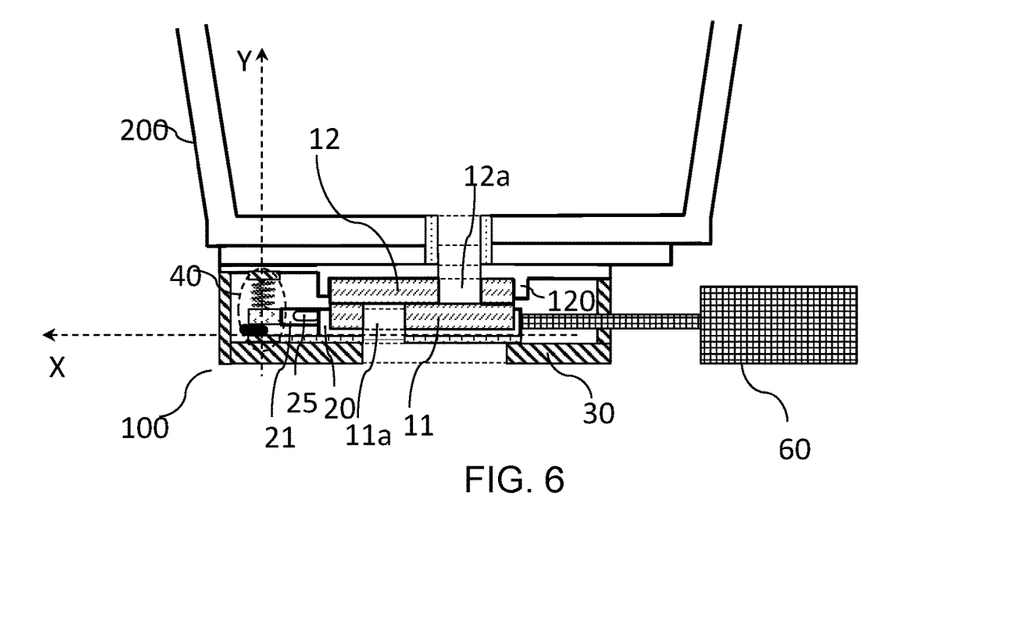

As mentioned above, the carriage is part of a sliding gate valve 100 for controlling a flow of liquid metal out of a metallurgic vessel 200. An example of a sliding gate valve comprising a carriage according to the present disclosure is schematically illustrated in FIG. 6. The sliding gate valve 100 comprises the carriage with the support structure 30 and the plate frame 20 supporting a first refractory plate 11. As schematically shown in FIG. 6, the carriage is coupled to a fixed underframe 120. The fixed underframe 120 of the sliding gate valve 100 is configured for supporting a second refractory plate 12 in a fixed position with respect to the fixed underframe. The fixed underframe 120 comprises fixing elements for fixing the fixed underframe to a bottom floor of the metallurgic vessel 200.

In FIG. 6, the plate frame 20 of the sliding gate valve 100 is positioned in the nominal end-position X1, i.e. the first bumper portion 21 is adjacent to the blocking member 41. This nominal end-position corresponds to a closed valve position, i.e. the apertures 11a, 12a of the first 11 and second 12 refractory plates are separated by a given distance defined such that the flow of liquid metal is stopped. In the closed valve configuration the apertures 11a, 12a are out of registry. In this example, the given separation distance between the open and the closed valve configuration corresponds to the first stroke ΔX1.

By driving the plate frame in a direction opposite to the direction of the axis X shown in FIG. 6, the plate frame can be moved to the initial position X0 corresponding to the open valve position, also named casting position. In this open valve position the apertures 11a, 12a of the first 11 and second 12 refractory plates are facing each other such that liquid metal is allowed to pass through the two apertures for supplying liquid metal from the vessel to the distributor. In this open valve configuration the apertures 11a, 12a are in registry.

As known in the art, the carriage 1 comprises resilient pressing elements configured such that when first and second refractory plates are supported in the respective plate frame 20 and fixed underframe 120 then a pressure is exercised pressing the sliding surface of the first refractory plate 11 against the sliding surface of the second refractory plate 12 when the plate frame 20 is located within the first stroke ΔX1, i.e. during nominal operation of the sliding gate valve. On the other hand, no pressure or a reduced pressure is exercised onto the sliding surfaces when the plate frame 20 is located at the service end-position X2, i.e. when performing a service activity on the sliding gate valve.

To facilitate the service activities, the coupling between the carriage and the fixed underframe is typically made through a hinged connection, not shown in FIG. 6, such that the carriage 1, after having positioned the plate frame in the service end-position X2, can be safely separated from the fixed underframe as a pivoting door.

The embodiment of a sliding gate valve shown in FIG. 6 is an example comprising two refractory plates, a fixed plate and a slidable plate. The present invention is however not limited by the number of refractory plates that are comprised within the sliding gate valves and embodiments comprising three refractory plates within a sliding gate valve are also conceived.

Various features and characteristics of the invention are described in this specification and illustrated in the drawings to provide an overall understanding of the invention. It is understood that the various features and characteristics described in this specification and illustrated in the drawings can be combined in any operable manner regardless of whether such features and characteristics are expressly described or illustrated in combination in this specification. The Inventor and the Applicant expressly intend such combinations of features and characteristics to be included within the scope of this specification, and further intend the claiming of such combinations of features and characteristics to not add new matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with the written description requirement under 35 U.S.C. § 112(a). The invention described in this specification can comprise, consist of, or consist essentially of the various features and characteristics described in this specification.

| # | Feature |
|---|---|
| 1 | Carriage |
| 11 | first refractory plate |
| 11a | first aperture |
| 12 | second refractory plate |
| 12a | second aperture |
| 20 | plate frame |
| 21 | first bumper portion |
| 25 | second bumper portion |
| 30 | carriage support structure |
| 40 | selecting device |
| 41 | blocking member |
| 41a | first side of blocking member |
| 41b | second side of blocking member |
| 42 | first frame member |
| 43 | second frame member |
| 44 | fixed rod |
| 45 | cam member |
| 45a | cam rotation axis |
| 45b | cam roller |
| 48 | compression spring |
| 49 | axle extension |
| 60 | driving device |
| 100 | sliding gate valve |
| 120 | fixed under frame |
| 200 | metallurgic vessel |
| D | separation distance |
| LB1 | length first bumper portion |
| LB2 | length second bumper portion |
| X | first axis |
| X0 | initial position |
| X1 | nominal end-position |
| ΔX1 | first stroke |
| X2 | service end-position |
| ΔX2 | second stroke |
| Y | second axis |

The invention claimed is:

1. A sliding gate valve for controlling a flow of liquid metal out of a metallurgic vessel, comprising
    a carriage for a sliding gate valve of a metallurgic vessel, comprising a carriage support structure and a plate frame for supporting a first refractory plate, and wherein the plate frame is slideably mounted on the carriage support structure for sliding along a first axis,
    a fixed underframe configured for supporting a second refractory plate in a fixed position with respect to the fixed underframe, wherein said fixed underframe comprises fixing elements for fixing the fixed underframe to a bottom floor of the metallurgic vessel,
    wherein said carriage is coupled to the fixed underframe, wherein said carriage and said fixed underframe are configured such that when first and second refractory plates are supported in the respective plate frame and fixed underframe, a sliding surface of the first refractory plate comprising first aperture can slide within a first stroke $\Delta X1$ against a sliding surface of the second refractory plate comprising a second aperture, thereby allowing to bring the first and second apertures in and out of registry, by sliding the plate frame to respectively an initial position of said plate frame corresponding to the open valve position and to a nominal end-position of said plate frame corresponding to a closed valve position,
    wherein said carriage support structure comprises a permanently attached selecting device for selecting between said first stroke $\Delta X1$ and a second stroke $\Delta X2$ of said plate frame with $\Delta X2 > \Delta X1$, and wherein the first stroke $\Delta X1$ and the second stroke $\Delta X2$ are defined as maximum plate frame sliding distances measured between the initial position and respectively the nominal end-position and a service end-position, and wherein said selecting device comprises a blocking member reversibly moveable between a blocking position for selecting the first stroke $\Delta X1$ and a non-blocking position for selecting the second stroke $\Delta X2$, wherein said plate frame and said selection device are configured such that when said blocking member is positioned in said blocking position, a first bumper portion of said plate frame is bumping into said blocking member if said plate frame is to slide beyond said nominal end-position, thereby limiting the plate frame to slide within said first stroke $\Delta X1$, and when said blocking member is positioned in said non-blocking position, the plate frame is free to slide within said second stroke $\Delta X2$, and consequently to slide beyond the nominal end-position to the service end-position,
    wherein said carriage comprises resilient pressing elements configured such that when first and second refractory plates are supported in the respective plate frame and fixed underframe then:
        a pressure is exercised by said resilient pressing elements pressing the sliding surface of the first refractory plate against the sliding surface of the second refractory plate when the plate frame is located within the first stroke, and
        no pressure or a reduced pressure is exercised by said resilient pressing elements onto the sliding surfaces when the plate frame is located at the service end-position,
    wherein said selecting device of said carriage support structure comprises a moving mechanism for moving the blocking member with respect to said carriage support structure between said blocking position and said non-blocking position, wherein said moving mechanism of the selecting device is configured such that when the plate frame is being moved from the service end-position towards the initial position, the blocking member automatically moves from said non-blocking position to said blocking position at the moment the plate frame is sliding beyond the first end position.

2. A sliding gate valve according to claim 1 wherein the moving mechanism is configured for translating said blocking member along a second axis (Y) transverse, normal to the first axis (X) between the blocking position and the nonblocking position.

3. A sliding gate valve according to claim 2 wherein said moving mechanism comprises one or more compression springs each having a central compression axis essentially parallel with said second axis (Y), and wherein each compression spring has a first end coupled to a first frame member of the selecting device and a second end coupled to said blocking member such that by compressing and de-compressing the one or more compression springs the blocking member is being translated along said second axis (Y).

4. A sliding gate valve according to claim 3 wherein said moving mechanism comprises a deblocking tool configured for exercising a force against a biasing force of the one or more compression springs in order to translate the blocking member along the second axis (Y) from the blocking to the non-blocking position.

5. A sliding gate valve according to claim 4 wherein said deblocking tool comprises a cam member located between a second frame member of the selecting device and said blocking member, and wherein said cam member is rotatable around a cam rotation axis normal to both first and second axes (X, Y) and configured such that a separation distance (D) between said second frame member and said blocking member is increasing when rotating the cam member from a first cam position to a second cam position, thereby compressing said one or more compression springs, said cam member is rotated over an angle between 80° and 120° when rotating from said first to said second cam position.

6. A sliding gate valve according to claim 5 wherein said cam member is coupled to an axle extension extending coaxially with said cam rotation axis and which rotation is driven by an operator, a motor, or a robot configured to rotate the cam member from the first cam position to the second cam position.

7. A sliding gate valve according to claim 5 wherein the cam member comprises a first end located on the cam rotation axis and a second end for driving the blocking member when moving from the first cam position to the second cam position, said second end comprising a cam roller configured to enter in a rolling contact with said blocking member.

8. A sliding gate valve according to claim 5 wherein said plate frame comprises a second bumper portion configured such that when said blocking member is located in the non-blocking position, the second bumper portion bumps against the cam member upon sliding from the nominal end position to the service end-position, thereby causing the cam member to rotate from the second cam position to the first cam position, the blocking member being prevented from translating to the blocking position by resting on a surface of the first bumper portion.

9. A sliding gate valve according to claim 1 wherein said first bumper portion has a length LB1 measured along an axis parallel with said first axis (X) and wherein LB1=$\Delta X2-\Delta X1$.

10. A sliding gate valve according to claim 8 wherein said first bumper portion and said second bumper portion have respectively a length LB1 and a length LB2 measured along an axis parallel with said first axis (X) and wherein LB2<LB1.

11. A sliding gate valve according to claim 1 comprising a driving device coupled to the plate frame and configured for driving the plate frame along said first axis (X) within the first stroke ΔX1 and within the second stroke ΔX2.

12. System comprising
- a sliding gate valve according to claim 1, and
- a robot configured to operate the moving mechanism of the carriage support structure from the blocking to the unblocking position.

13. System comprising
- a sliding gate valve according to claim 6, and
- a robot configured to operate the moving mechanism of the carriage support structure from the blocking to the unblocking position,
- wherein the robot is configured to rotate the cam member from the first cam position to the second cam position.

\* \* \* \* \*